(12) United States Patent
Guenther et al.

(10) Patent No.: US 7,213,151 B2
(45) Date of Patent: May 1, 2007

(54) METHOD AND COMPUTER SYSTEM FOR ENCODING OF INFORMATION INTO A REPRESENTATION

(75) Inventors: Carsten Guenther, Bammental (DE); Werner Kriechbaum, Ammerbuch-Breitenholz (DE); Siegfried Kunzmann, Heidelberg (DE); Bernhard Hubert Zeller, Heidelberg (DE)

(73) Assignee: International Business Machines Corporation, Armonk, NY (US)

( * ) Notice: Subject to any disclaimer, the term of this patent is extended or adjusted under 35 U.S.C. 154(b) by 818 days.

(21) Appl. No.: 10/185,703

(22) Filed: Jun. 27, 2002

(65) Prior Publication Data

US 2003/0074561 A1 Apr. 17, 2003

(30) Foreign Application Priority Data

Sep. 28, 2001 (EP) .................................. 01123403

(51) Int. Cl.
*H04L 9/00* (2006.01)
*G06K 9/32* (2006.01)
*G06K 9/36* (2006.01)

(52) U.S. Cl. ..................... 713/176; 382/276; 382/293
(58) Field of Classification Search ................ 713/176; 382/276, 293
See application file for complete search history.

(56) References Cited

U.S. PATENT DOCUMENTS

| 6,208,745 | B1 | 3/2001 | Florencio et al. ............ 382/100 |
| 6,959,383 | B1* | 10/2005 | Terada et al. ............... 713/176 |
| 2001/0054150 | A1* | 12/2001 | Levy .......................... 713/176 |
| 2002/0059520 | A1* | 5/2002 | Murakami et al. ........... 713/176 |

\* cited by examiner

*Primary Examiner*—Kambiz Zand
*Assistant Examiner*—Kaveh Abrishamkar
(74) *Attorney, Agent, or Firm*—David A. Mims, Jr.

(57) ABSTRACT

The present invention relates to a computer system and to a method for encoding of information into a representation comprising a plurality of segments, the order of the segments in the representation being irrelevant for a rendering of the representation, the method comprising the steps of:
identification of the segments,
permutation of the segments to encode the information.

7 Claims, 4 Drawing Sheets

Permutation

Figure 1:
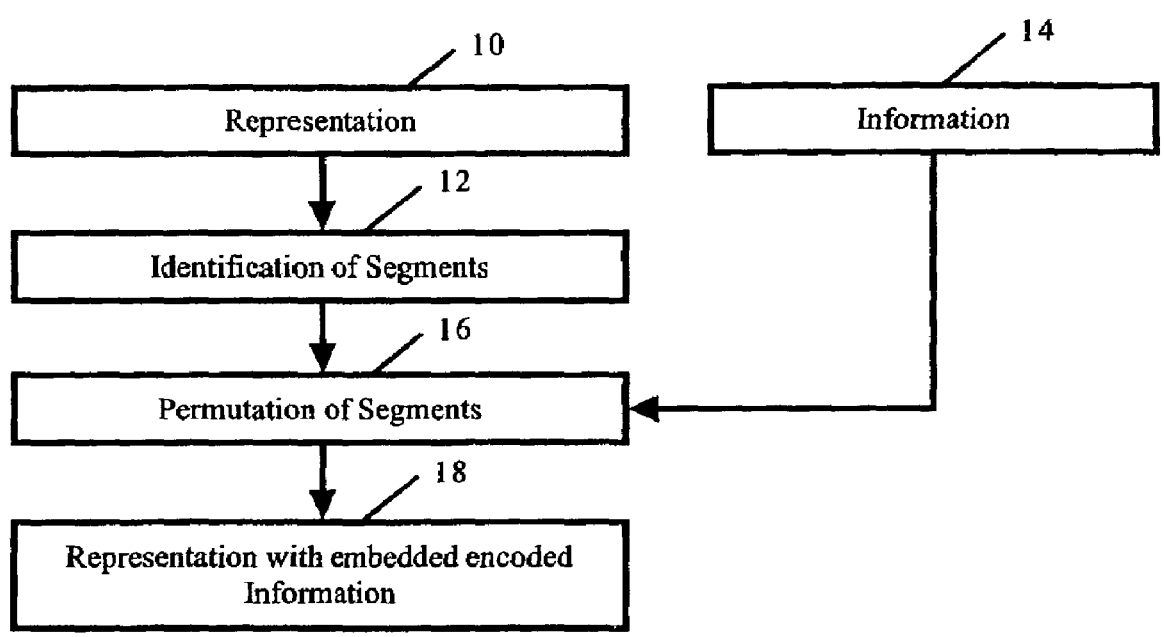

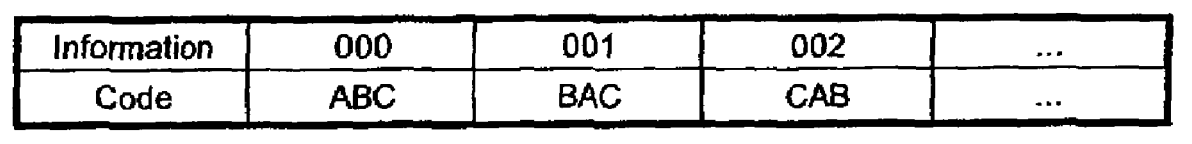

| Information | 000 | 001 | 002 | ... |
|---|---|---|---|---|
| Code | ABC | BAC | CAB | ... |

Fig. 3

METHOD AND COMPUTER SYSTEM FOR ENCODING OF INFORMATION INTO A REPRESENTATION

FIELD OF THE INVENTION

The present invention relates to the field of encoding of information in particular for the purposes of watermarking and tracking a product within a distribution chain.

BACKGROUND AND PRIOR ART

From the prior art a variety of techniques is known for embedding information into a data file. U.S. Pat. No. 6,208,745 shows an apparatus that inserts watermark information directly into an encoded video bit stream. The method identifies specific blocks or macro blocks in an encoded video bit stream and inserts the watermark information directly into the bit stream such that these selected blocks are replaced with a block containing watermark information or augmented with watermark information.

U.S. Pat. No. 6,201,881 shows a method for embedding of information in a three-dimensional geometric model by changing geometric parameters of a three-dimensional geometric model. The three-dimensional geometric model comprises polyhedrons, lines, a set of points, or curved surfaces which are primitives (components) of the model. Each primitive is defined by a geometric parameter. The geometric shape of a three-dimensional geometric model is defined by a set of many geometric parameters. The information is embedded by changing the geometric parameters of a plurality of primitives constituting a three-dimensional geometric model.

It is a common disadvantage of prior art methods for adding or "hiding" information in a data file that the data file itself is affected by the added information such that a rendering of the data file is not identical after the information has been added in comparison to a rendering of the original data file.

It is therefore an object of the present invention to provide an improved method, computer program product and computer system for providing an improved technique for encoding of information into a representation.

The underlying problem of the invention is solved basically by applying the features laid down in the independent claims. Preferred embodiments of the invention are given by the dependent claims.

The term representation is used in this document for any file which contains data for generating or rendering an object by means of a program. In general, such data has little or no redundancy which makes the application of prior art watermarking techniques practically impossible. Further the term representation as used in this document also encompasses command or program files such as DLL files and also compiled binary programmers. In other words the data contained in a representation is of a symbolic nature and requires interpretation by means of a computer program or a dedicated hardware.

The invention is particularly advantageous in that it allows to encode additional information into a representation without affecting a rendering of the representation. In fact the content of the original representation remains unchanged; information is only added by re-ordering the segments of the representation.

The re-ordering of the segments—by definition of the applied data format or standard—does not affect the rendering.

This is the case for all data formats and standards where the segments of the representation have an arbitrary order. In other words this is the case where the order of the segments in a representation does not carry information which affects the rendering of the representation.

Examples for such data formats and standards that support arbitrary ordering of segments are the Musical Instrument Digital Interface (MIDI), the Virtual Reality Modeling Language (VRML), vector graphics like Post Script files, PDF files and Dynamic Link Library (DLL) files.

The MIDI standard is described in the "Complete MIDI 1.0 Detailed Specification", MIDI Manufacturers Association, March 1996. A MIDI file contains a number of MIDI sound modules within the data structure as specified in the above-referenced MIDI 1.0 Specification. The ordering of the sound modules within the MIDI file has no impact on the rendering of the file by an instrument, such as a synthesizer, having a MIDI interface.

Another example is VRML. This is a language for describing multi-participant interactive simulations such as virtual worlds networked via the global internet and hyper-linked with the World Wide Web. VRML allows for the creation of the virtual worlds which contain objects which have hyperlinks to other worlds, HTML documents or other valid VMRL or MIDI types. The ordering of those objects within a VRML file does not impact the virtual world which is represented by those objects. In other words the rendering of a VRML file does not change if the order of the objects within the file is interchanged.

Likewise Post Script files, DLL-files and MPEG 4 and MPEG 7 files contain segments of data of arbitrary ordering. Again the ordering of the data in such file formats can be arbitrarily changed without impacting the rendering of the corresponding file. This is also true for vector graphic files and other files containing data objects.

The present invention is particularly advantageous in that it can be employed for any kind of data format having segments of data with an arbitrary ordering such that the rendering of the data file is invariant against changing the order of the segments within the file.

It is a further advantage of the invention that it enables to "hide" information in such files where prior art watermarking techniques fail. According to the invention information can be hidden in such files which have no or little redundancy within the individual segments of data. This compares to prior art watermarking techniques which are not applicable to such data formats with no or little redundancy in the segments without corrupting the rendered file.

Applications of the present invention includes coding of identification data within the file to identify and/or track the file, for example by means of a serial number. Further information being descriptive of the manufacturer or the origin or the author of the file can be coded into the representation. However it is to be noted, that the invention enables to encode or "hide" any kind of information in a representation.

A particular field for application of the present invention is to encode an ID number within a data file which is to be handed over to a sub-contractor for the creation of a product, such as an ASIC. It is common practice in all kinds of industry to outsource parts of design work to a network of sub-contractors. This implies the challenge of keeping track of the information flow from and to the sub-contractors. For example, if a file containing a construction plan for an ASIC or another file containing blue-print is to be given to a sub-contractor an ID number of the originating company is encoded into the representation in order to identify the representation at any time.

Another field of application of the present invention is to control a distribution chain. Certain products have specified distribution chains where only authorized dealers are allowed to trade a certain good. To maintain and control such a restricted distribution chain the present invention can be employed as it allows to identify the origin of the product and its allowed distribution path.

In a further preferred embodiment of the invention the information hidden in the representation is used for the purposes of anti-counterfeit and copy protection. In case of a "scrambling attack" where the ordering of the segments in the representation is randomized in order to erase the hidden information the scrambled file becomes unusable as the file requires a matched renderer that expects anchor sequences at fixed positions that dependent on the encoded serial number.

In accordance with a further preferred embodiment of the invention only a small portion of the segments of a representation is used to encode information for the personalization of the file. This has the advantage that using only a relatively small portion of the segments makes it harder to identify the hidden information and to erase or alter it.

Figure 2:
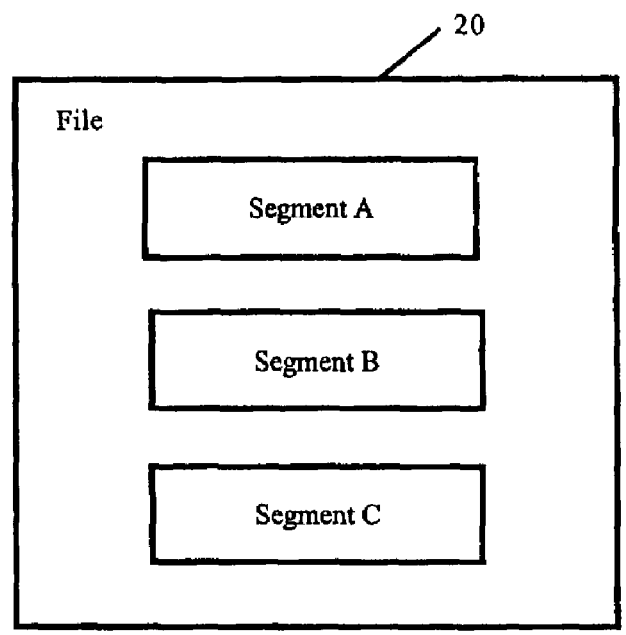
Figure 2:
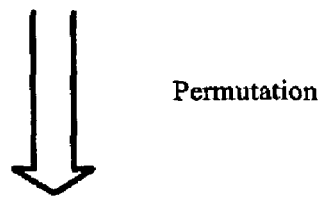
Figure 2:
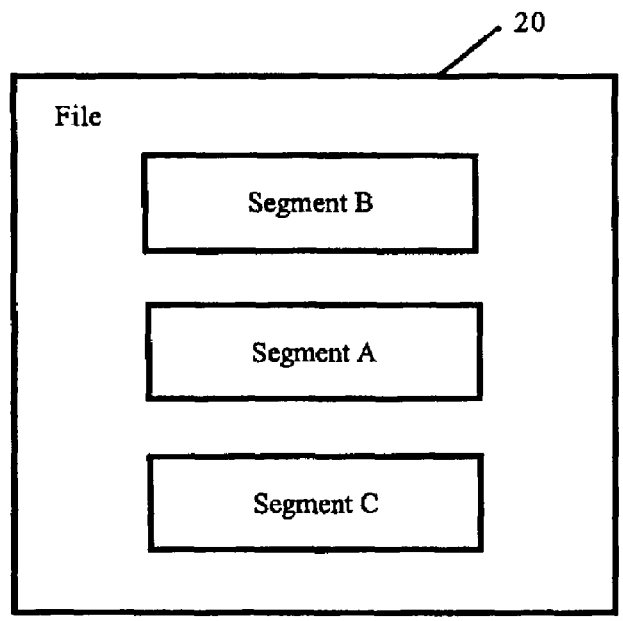
Figure 4:
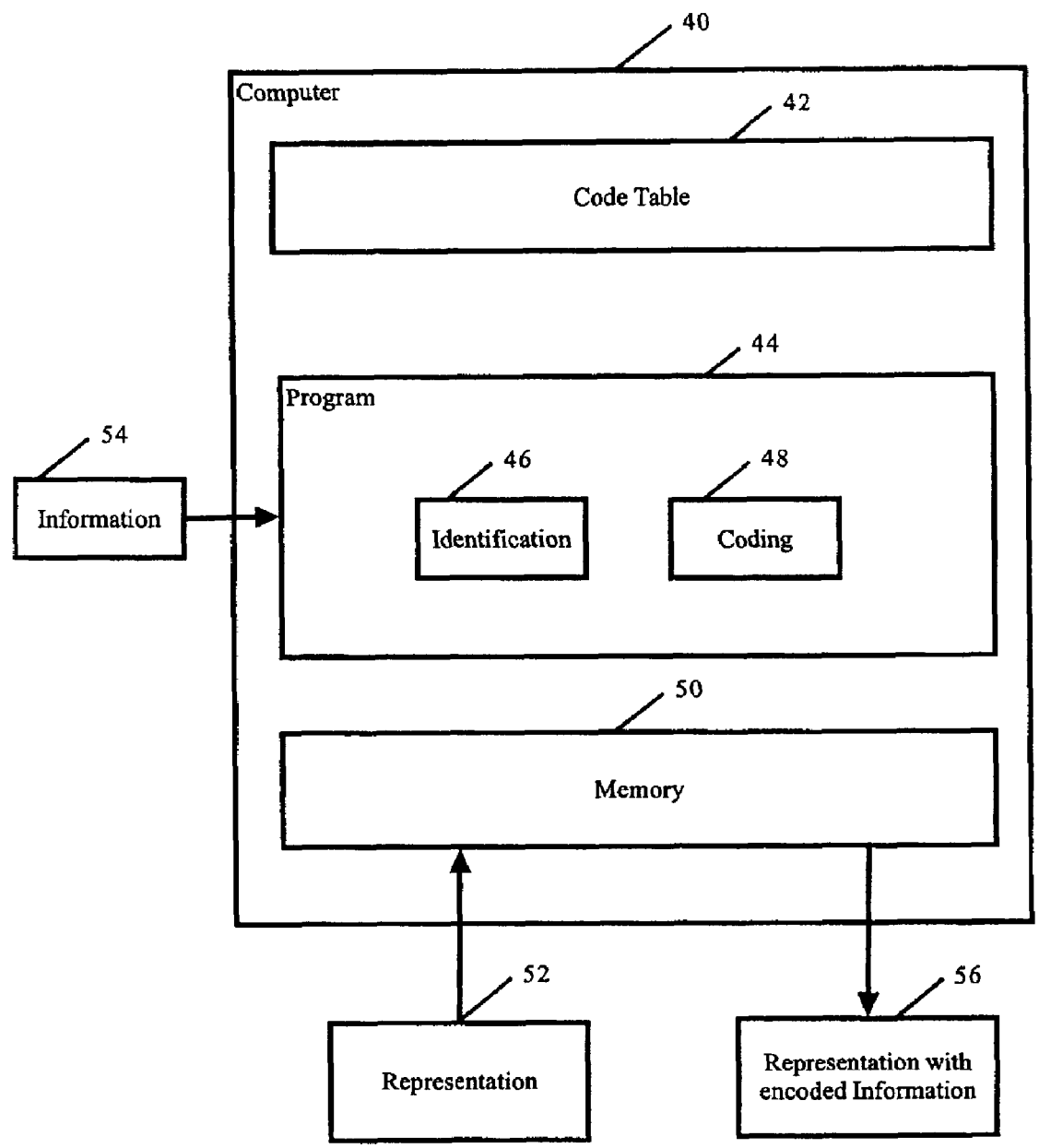

In the following preferred embodiments of the invention are described in greater detail by making reference to the drawings in which:

FIG. 1 is illustrative of an embodiment of the invention for encoding information into a representation, FIG. 2 is illustrative of the permutation of segments within a representation to encode information, FIG. 3 is illustrative of a code table used for the encoding of the information, FIG. 4 is a block diagram of a computer system for implementation of the method of FIG. 1.

The flow chart of FIG. 1 is illustrative of an embodiment of the present invention. In step 10 a representation is provided. The representation is a file containing a number of segments of data. The ordering of the segments within the representation is arbitrary and does not affect the rendering of the representation. Examples of corresponding file formats are the Musical Instrument Digital Interface (MIDI), the Virtual Reality Modeling Language (VRML), Post Script, PDF, vector graphics, outputs of computer aided design programs and dynamic link libraries (DLL).

In step 12 the representation is provided to a computer program. The data structure definition of the applicable standard is integrated within the computer program in order to allow the computer program to identify segments of data within the representation which can be re-ordered without changing a later rendering of the representation.

In step 14 information is provided by a user or by another computer program. The Information provided in step 14 is to be coded or "hidden" within the representation. The information can be of any kind. Potential applications include a copyright notice, manufacturer data, an identification or serial number, a date or an authorized distributor chain.

In step 16 the segments identified in step 12 are re-ordered to encode the information provided in step 14. The encoding is done by performing a permutation on the segments in accordance with a code table or other coding algorithm.

In step 18 the representation with the permutated segments is outputted. The permutation of the segments carries the information provided in step 14.

The representation outputted in step 18 produces the same result when it is rendered in comparison to the original representation provided in step 10. This is a particular advantage of the invention as the hiding of the information provided in step 14 does not at all impact the quality of the rendering.

In accordance with a particular application of the invention the device which is used for the rendering expects the information provided in step 14. Before the rendering starts the rendering device checks if this expected information is present in the file to be rendered. Only if this pre-defined information is in fact encoded within the permutation of the segments the rendering starts. If the contrary is the case the device refuses the representation. For example, if the information provided in step 14 is a copyright notice, the device would refuse to render the representation if the copyright notice has been erased or altered. Likewise it is possible to make the rendering of the representation by the device dependent on the identification of other information such as a serial number or license number.

FIG. 2 shows a diagram illustrating the encoding of the information performed by means of the method of FIG. 1. FIG. 2 shows a file 20 which is a representation containing segments of data, i.e. segment A, segment B and segment C. Again the ordering of the segments A, B and C is arbitrary and does not affect the rendering of the file.

By means of a permutation the ordering of the segments within the file 20 is changed to B, A, C. When the code table of FIG. 3 is used this corresponds to the information "001".

In other words: If the information "001" is to be coded into the file 20 the ordering of the segments needs to be B, A, C in accordance with the code table of FIG. 3.

In a more general case a number of n segments of a file are used for the encoding of information. In this case $2^n$ different permutations can be done with the n segments. This allows to encode a number of $2^n$ data words.

The block diagram of FIG. 4 shows a computer 40. The computer 40 has a code table 42 or alternatively a coding algorithm in order to specify an order of data segments of the file for a given information to be hidden.

Further the computer 40 has a program 44. The program 44 has an identification module 46 and a coding module 48. The identification module 46 serves to identify segments of data which can be re-ordered without impacting a later rendering. The coding module 48 serves to determining the required order of the data segments by means of the code table 42 to encode a given information.

Further the computer 40 has a memory 50 for buffering a representation 52 which is inputted into the computer 40 for encoding of information 54.

In operation the representation 52 (cf. file 20 of FIG. 2) is inputted into the computer 40 and stored in the memory 50. Further the information 54 to be encoded into the representation 52 is inputted into the computer 40 and specifically into the program 44.

The program 44 identifies segments of data in the representation 52 by means of its identification module 46. Further the program 44 determines by means of its coding module 48 a required ordering of the segments identified by the identification module 46 to encode the information 54. This is done by the coding module 48 by accessing the code table 42.

Next the program 44 re-orders the segments of the representation 52 within the memory 50 in accordance with the output of the coding module 48.

A resulting representation 56 is then outputted from the memory 50. The representation 56 contains the information 54 which is carried by the particular ordering of its segments.

| LIST OF REFERENCE NUMERALS | |
|---|---|
| step | 10 |
| step | 12 |
| step | 14 |
| step | 16 |
| step | 18 |
| file | 20 |
| computer | 40 |
| code table | 42 |
| program | 44 |
| identification module | 46 |
| coding module | 48 |
| memory | 50 |
| representation | 52 |
| information | 54 |
| representation | 56 |

The invention claimed is:

1. A method for encoding of information into a representation comprising a plurality of segments, the order of the segments in the representation being irrelevant for a rendering of the representation, the method comprising the steps of:

identifying within said representation the segments which can be reordered without changing a later rendering of said representation;

providing unique information for encoding in said representation;

performing permutation of the segments to encode the unique information and reorder the segments per said identifying step;

outputting and saving said representation having said encoded segments; and rendering said saved encoded segments to produce the same results as said representation having no encoding.

2. The method of claim 1 whereby the unique information comprises data for identification of the representation such as a serial number.

3. The method of claim 1 where the unique information comprises data indicative of an author, company name or origin of the representation.

4. The method of claim 1 where the unique information comprises data indicative of a calendrical date.

5. The method of claim 1 the representation having a format of anyone of the formats contained in the group of: Musical Instrument Digital Interface (MIDI), Virtual Reality Modeling Language (VRML), a vector graphics format, Post Script, Dynamic Link Library (DLL) format.

6. A computer program product comprising means for carrying out a method in accordance with claim 1 when the computer program is carried out on a computer.

7. A computer system comprising means for performing a method in accordance with claim 1.

* * * * *